United States Patent [19]

Sochor

[11] Patent Number: 4,491,861
[45] Date of Patent: Jan. 1, 1985

[54] TWO-CHANNEL TRANSMISSION OR STORAGE METHOD FOR DIGITAL COLOR TELEVISION SIGNALS

[75] Inventor: Josef Sochor, Dieburg, Fed. Rep. of Germany

[73] Assignee: Robert Bosch GmbH, Stuttgart, Fed. Rep. of Germany

[21] Appl. No.: 381,573

[22] Filed: May 24, 1982

[30] Foreign Application Priority Data

Jun. 2, 1981 [DE] Fed. Rep. of Germany ....... 3121847

[51] Int. Cl.³ .......................... H04N 9/32; H04N 9/38
[52] U.S. Cl. .................................. 358/13; 358/16; 358/310
[58] Field of Search .................. 358/13, 12, 14, 16, 358/310, 311, 312

[56] References Cited

U.S. PATENT DOCUMENTS

| | | | |
|---|---|---|---|
| 4,051,516 | 9/1977 | Weston | 358/13 |
| 4,212,028 | 7/1980 | Drewery | 358/16 |
| 4,275,411 | 6/1981 | Lippel | 358/13 |
| 4,376,957 | 3/1983 | Dischert et al. | 358/310 |

Primary Examiner—Michael A. Masinick
Assistant Examiner—Luan Nguyen
Attorney, Agent, or Firm—Frishauf, Holtz, Goodman & Woodward

[57] ABSTRACT

In order that each of two recording channels utilized for a single color television signal may be used if necessary to provide a complete picture with only a loss of quality, digitally coded signal samples of the luminance signal and of the two chrominance signal components are equally distributed between the two channels, successive luminance component samples going alternately to the two channels, each pair made up of related samples of the two chrominance components going entirely to one channel or the other, with successive pairs going to different channels. With the usual input sequence, a simple transposition of the sample sequence in one channel can make the sequences of the various components in the two channels identical.

6 Claims, 5 Drawing Figures

| 4:2:2 Input Signal | V Y U Y V Y U Y V Y U Y V Y U Y V Y V Y — 0 |
|---|---|
| 2:1:1 Signal in Chan. 1 | V Y      Y U   V Y      Y U   V Y — 1 |
| 2:1:1 Signal in Chan. 2 |    U Y V     Y     U Y V     Y — 2 |

Fig. 1

TWO-CHANNEL TRANSMISSION OR STORAGE METHOD FOR DIGITAL COLOR TELEVISION SIGNALS

This invention concerns a method of distributing digital color television signals between two channels that are designed to enable transmission and/or recording of less bandwidth than is necessary for transmitting the signals in one channel. Two-channel systems are already known for making it possible to use transmission or record storage facilities of more limited bandwidth. A method is disclosed in DE-AS 25 58 971 for preparation of color television signals conforming to the European or PAL standard for digital transmission and/or processing according to which analog color television signals of the PAL standard are received and digitalized by sampling. From the sampling there are provided by this method from the two color difference signals U and V, alternately, the sum U+V and the difference U−V, and these are transmitted in successive television lines. Accordingly, the chrominance signals U+V and U−V can be processed at the same time in parallel with the luminance signal Y and the latter can be sampled at twice the PAL reference color carrier frequency, while the sampling frequency for the digitalization of the chrominance signals corresponds to the PAL reference color carrier frequency. A disadvantage of this known transmission method is the necessity of delay devices for producing the sum and difference of the chrominance signal components and for separation thereof into the chrominance signal components U and V after transmission. A further disadvantage is the transmission of the luminance signal Y in one channel and the parallel processing of the combined chrominance signals in a second transmission channel. In the case of a disturbance or failure in one channel, either the luminance information or the color information is lost for a certain time interval which produces plainly visible disturbances in the reproduced picture.

A method is also known from British Pat. No. 1,518,126 for storing digital color television signals with a luminance or brightness component and two color difference signal components. The two chrominance components are written into different storage units and modified lines are produced from the digital words which in the content of these storage units represent and provide the chrominance signal and, in the content of another storage unit, contain the luminance information in digital form. These modified lines alternately contain in one line the Y and I components, and in the next line the Y and Q components (I being a symbol for U +V, and Q a symbol for U −V). A disadvantage of this known system is that as the result of the single-channel recording, the I and Q components succeed each other only in alternate lines, and in the case of a disturbance, only one of the components can be recombined to the desired chrominance signal.

THE INVENTION

It is an object of the present invention to provide a system in which the luminance component is sampled at twice the rate at which the chrominance components are sampled, and in which the resulting digital television signals are distributed between two channels in order to make possible the use of relatively narrowband transmission and/or recording channels, while at the same time each channel will have enough information to provide a picture that is only slightly deteriorated in case the other channel fails.

Briefly, the digital signals representing each of the three components are distributed equally between the two channels and in order to obtain advantages for obtaining a picture from only one channel, successive luminance information samples are alternately distributed to the two channels, while information samples regarding the components of the chrominance signal remain grouped in time-correlated pairs found in the same channel. To do this the samples of the luminance component and the two chrominance components are distributed in digital words of different length always containing a sample of the luminance component and sometimes containing no sample of either of the chrominance components, sometimes one sample of one of the chrominance components and sometimes one sample of each of the chrominance components, these samples in this last case being a time-correlated pair of components. To accomplish the objectives of the distribution, in one channel there are alternately three-sample and one sample digital words, while in the other one there are only two sample digital words. The word pairs made up of two-sample words that most closely succeed each other (i.e. those separated by the one sample words going to the other channel) contain time-correlated samples of the two chrominance signals in respective members of each such pair.

The method of the invention has the advantage that by the special distribution of the digitally coded signals for luminance and chrominance to two channels, there is always available in both channels a signal corresponding to the other hierarchic family. That means that when there is a complete failure of one channel (disturbance by drop-out or signal error, or slow-motion over several recording tracks), there is always available, at least in selections or extracts, the signal of the lower hierarchic family by which the complete signal can be replaced at the cost of a loss of quality. It is a particularly useful additional feature of the invention that the absolute order of sequence of the respective digital words for the luminance information Y and the chrominance components U and V can be made to be the same by a simple shuffling of samples in one channel. All these advantages are obtained merely by a special quasigeometric distribution of the signals to the two channels without any necessary increase of the overall bit-rate to be transmitted.

THE DRAWINGS

The invention is further described by way of example with reference to the annexed drawings, in which:

FIG. 1 is a diagram setting forth schematically the principle of data distrubution to two channels according to the invention;

DESCRIPTION OF THE ILLUSTRATED EMBODIMENT

Figure 2:
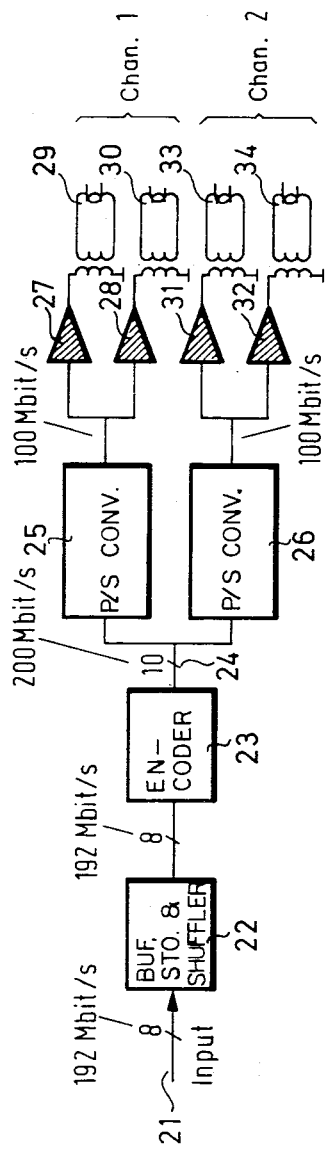
FIG. 2 is a circuit block diagram of a recording system in which the method of the invention is practiced.

FIG. 1 is a diagram showing, one above the other, an input signal (level 0), the portions of the input signal that go to a first channel (level 1) and the portions of the input signal that go to a second channel (level 2), in that order. The signals at level 0 are those in the transmission path which is to be split into two channels for transmission and/or recording. Into this path, color television information enters in digitally coded form with the sequence Y, U, Y, V, Y, . . . , each capital letter designating a digitally coded sample of the signal component represented by the capital letter according to the component designations already used above. It is evident from this sequence that the respective sampling frequencies of the luminance information Y and the chrominance components U and V have the ratio 4:2:2 in the input channel of the distribution system.

The distribution of the broadband input signals to two narrow band recording or transmission channels is performed, according to the principle of the invention, so that in each channel the luminance information Y and two chrominance components U and V belonging together are available as closely together in sequence as possible. The sample frequencies in the two equivalent channels 1 and 2 are lower by half in comparison with the sample rate in the input channel, this being indicated by the numerical ratio 2:1:1 at the left in levels 1 and 2, in the FIG. 1 diagram.

In the illustrated example, a distribution of the information on the two equivalent channels 1 and 2 provides in the first channel the sequence Y, Y, U, V, Y, Y, U, V . . . , and in the other channel the sequence U, Y, V, Y, U, Y, V . . . Both channels are equally used with respect to their transmission bandwidth, successive luminance information samples are alternately distributed to the two channels, and information regarding the components of the chrominance signal remain grouped in time correlated pairs found in the same channel, this being true for both channels.

If it should be found necessary to make the sequence of luminance and chrominance components exactly the same for both channels, this could easily be done by the provision of a selective access temporary memory, or other similar circuit elements in one or both channels. For example in channel 1, by interchanging the position of the color information component U with the adjacent luminance information sample Y, a sequence corresponding to the sequence in channel 2 can be obtained.

In the illustrative embodiment of a recording apparatus for use with the above-described method, which is shown in FIG. 2, a signal present at the input 21 in 8-bit parallel form, with a bit rate of 192 Mbit per second, is first supplied to a buffer store 22, in which the sequence of the successive 8-bit words is changed in accordance with a distribution pattern such that longer signal dropouts can produce no consistent disturbance. This is known as shuffling. Thereafter the signals go to an encoder 23, where the 8-bit code signals are converted into signals of a 10-bit code, this conversion providing at the same time error protection by the insertion of parity bits. As shown in FIG. 2, this operation increases the bit rate. At 24, a branching of the output of the circuit 23 is indicated, and this is to be understood as representing a switching circuit in which the information in 10-bit parallel form is distributed between the two channels 1 and 2, in accordance with the sequence illustrated in FIG. 1. In the parallel-to-series converters 25 and 26, the information is converted into serial form. Since the rotary headwheel recording systems that are now generally in use provide a pair of magnetic recording heads for each channel, each being operative half of the time, the output of the converters 25 and 26 must again be branched, and amplifiers 27 and 28 are provided ahead of the recording heads 29 and 30 for channel 1, and likewise amplifiers 31 and 32 ahead of the recording heads 33 and 34 for channel 2.

Figure 3:
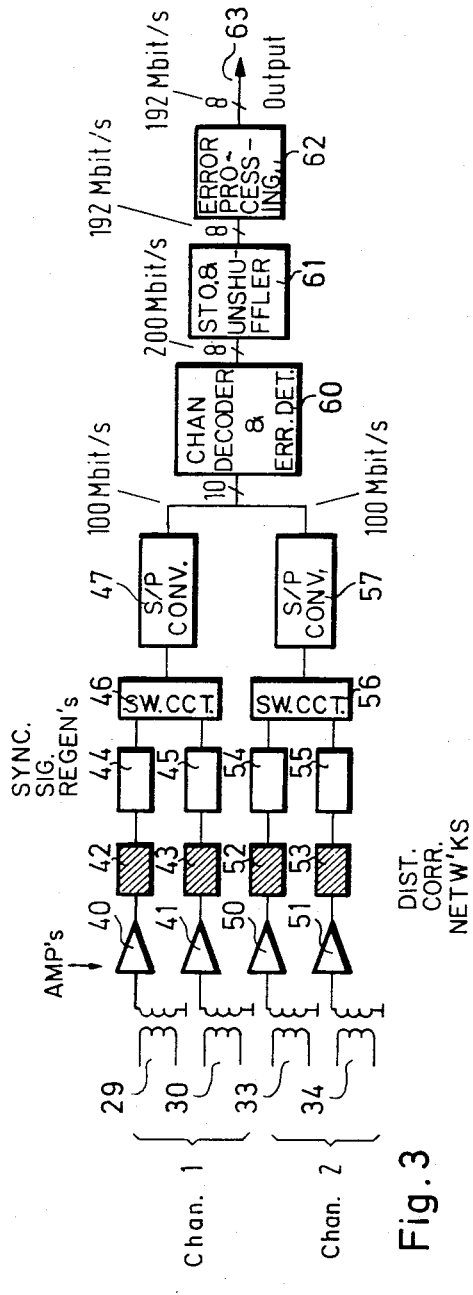
FIG. 3 is a circuit block diagram of a playback system for use in accordance with the invention.

FIG. 3 shows the corresponding reproduction system, with the magnetic pick-up heads 29 and 30 for channel 1 connected to the reproduction amplifiers 40 and 41, distortion corrector networks 42 and 43, and synchronizing signal regenerators 44 and 45 that recover the synchronizing signals. A switching circuit 46 alternately switches the signals from the magnetic pick-up heads 29 and 30 belonging to channel 1 into a common output line, the switching being timed, so that a magnetic head is switched through to the output line during the interval for which it is in contact with the magnetic tape on which the signals are recorded. The serial bit stream at the output of the switching circuit 46 is then supplied to the serial-to-parallel converter 47, at the output of which 10-bit parallel signals at a bit rate of 100 Mbit per second appear. In the same way the signals of the magnetic pick-up heads 33 and 34 of playback channel 2 are amplified in playback amplifiers 50 and 51, have their distortion corrected in networks 52 and 53, and have their synchronizing signals reconstituted in regenerators 54 and 55. The switching circuit 56 puts together the signals alternately picked up by the magnetic heads 33 and 34, and the continuous stream of signals is then converted by the serial-to-parallel converter 57 into a 10-bit parallel data stream of a bit rate of 100 Mbit per second.

The two 10-bit parallel data streams, respectively at the outputs of the serial-to-parallel converters 47 and 57, are put together at a sample rate that is now twice as high as the sample rate in the individual channels, so that we now have a combined signal with a bit rate of 200 Mbit per second, which then proceeds to the channel decoder 60, which includes an error detection circuit and provides 8-bit parallel signals at its output. This output goes to a storage unit 61 which serves to reconvert the information bits to correspond to the original signal, so that the sequence of the 8-bit sample words is reconstituted (unshuffled) into its original order of sequence. Finally, in the circuit 62, the errors detected in the circuit 60 are eliminated or concealed by circuits of known types, so that at the output 63 a digital color television signal, that is to a great extent free of errors, is made available for further processing and/or display.

Figure 4:
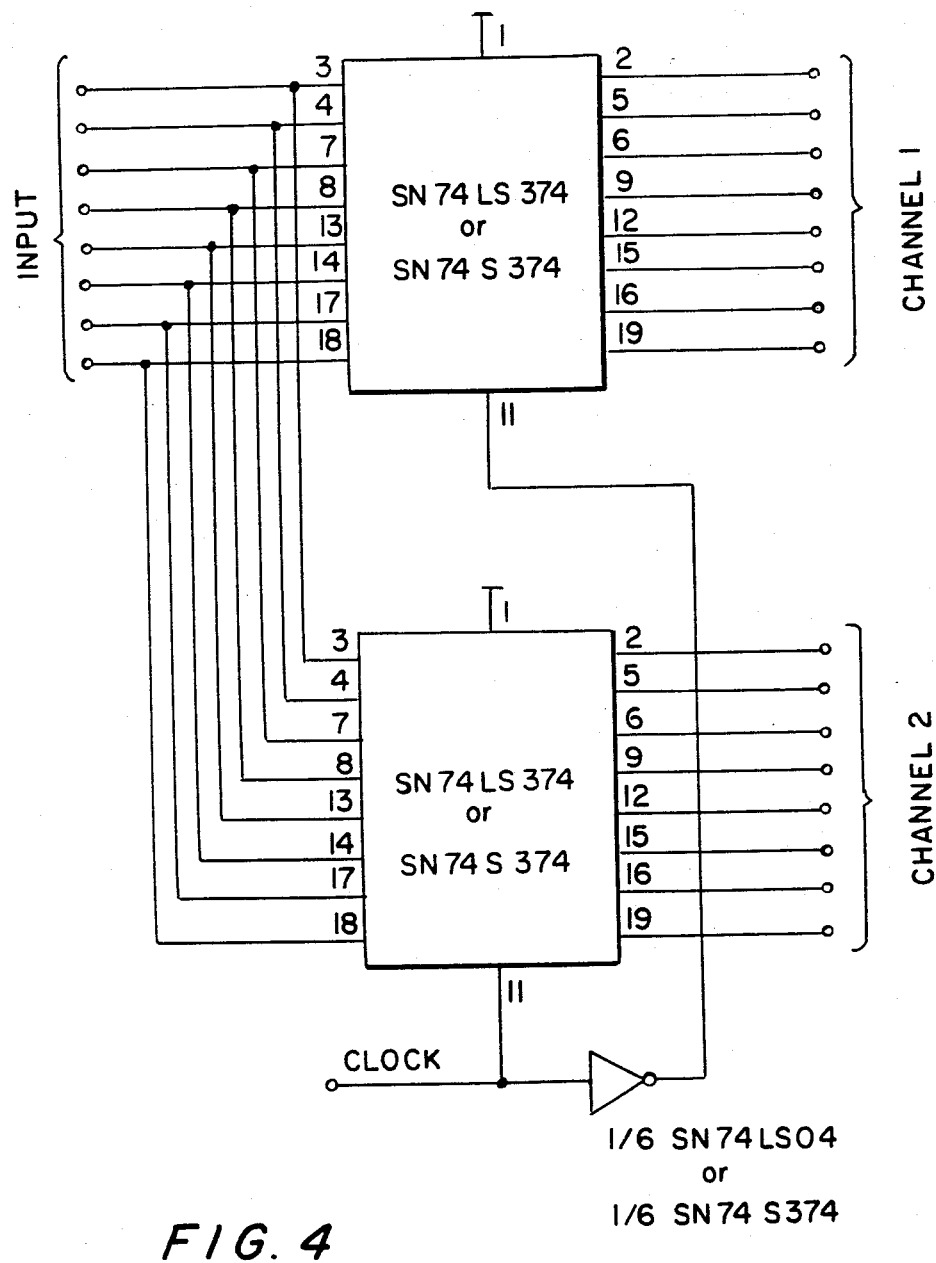
FIGS. 4 and 5 are circuit diagrams showing apparatus for distribution in accordance with FIG. 1.

FIG. 4 is a circuit diagram, showing schematically the utilization of conventional known technology for the distribution of the various components of the color television picture to the two channels in accordance with FIG. 1. For it there are used two Octal D-type transparent latches and edge-triggered flip-flops, which are offered as SN 74 LS 374 or SN 74 S 374 by Texas Instruments.

As clock there is used a meander impulse train with a mark to space ratio of one. Owing to the usage of the inversion stage one of the above mentioned integrated circuits is triggered by the positive edge and the other by the negative edge of the original clock pulse train.

Figure 5:
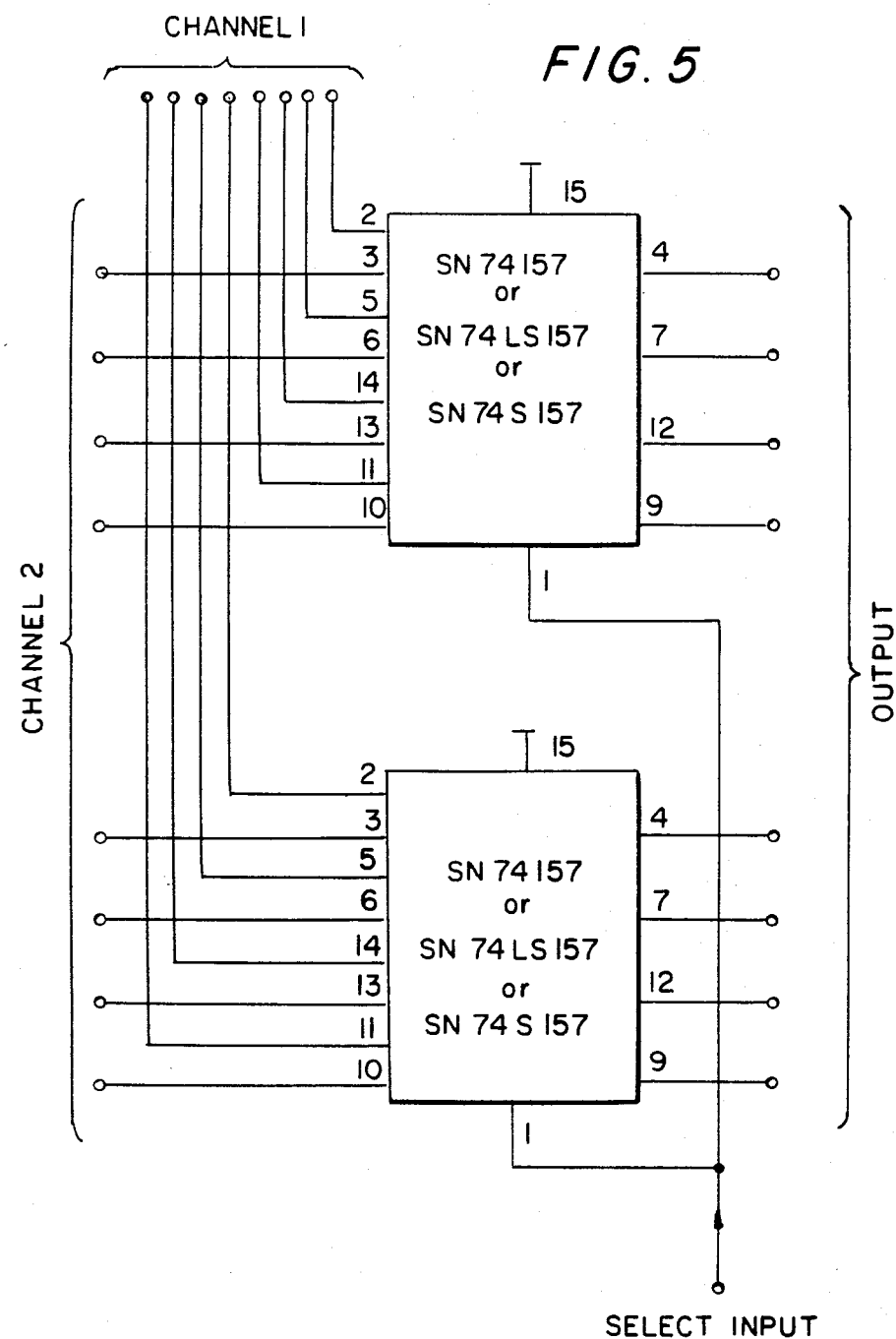

For combining the component signals two Quadruple 2-Line-to-1-Line-Data-Selectors/multipliers as Texas Instrument SN 74 157 or SN 74 LS 157 or SN 74 S 157 are connected as schematically shown in FIG. 5. Each of two integrated circuits has two groups of input terminals which are connected by turns with the particular-output terminals depending on the level of the "select input pulse".

Although the invention has been described with reference to particular illustrative embodiments, it will be understood that various modifications and variations may be made within the inventive concept.

I claim:

1. A method of transmitting or storing digitally coded color television signals of the separately coded type by means of two channel paths of reduced band-width, incorporating the improvements including the steps of:

sampling the two components (U, V,) of the chrominance signal at a first frequency to produce two respective sampled chrominance signal components;

sampling the luminance signal (Y) at a second frequency which is twice as high as said first frequency to produce a sampled luminance signal component;

distributing said three sampled signal components (U, V, Y) in such a manner that both channels are substantially equally used with respect to their transmission bandwidth, successive luminance information samples are alternately distributed to the two channels, samples of both sampled chrominance components are distributed to both channels at substantially the same rate;

time-correlated pairs of samples respectively from said two sampled chrominance components always appear in the same channel.

2. Method as defined in claim 1 in which the absolute order of sequence of the respective samples of said sampled luminance signal (Y) and said two chrominance signal components (U and V) in the two channels are made the same by an additional step of rearranging the order of sequence of the samples of selected sample pairs in one channel.

3. Method as defined in claim 2, in which the selected sample pairs which are rearranged in said additional step are composed of a sample of said luminance signal and a sample of one component of the chrominance signal which is always the same component for the pairs of samples which are rearranged.

4. Method according to claim 1, in which the step of distributing said three sampled signal components is produced by alternately providing to said channels digital words containing in each case either one, two or three samples, said one sample words containing only a sample of said luminance signal, said two sample words containing a sample of said luminance signal and a sample of one or the other of said chrominance signal components and said three sample words containing a sample of said luminance signal and a sample of each of said chrominance signal components, said one-sample and three-sample word being distributed to one of said channels and said two-sample words, alternating sequentially in the identity of the chrominance signal component represented by a sample in said words, being distributed always to the other of said channels.

5. Method as defined in claim 4 in which the absolute order of sequence of the respective samples of said sampled luminance signal (Y) and said two chrominance signal components (U and V) in the two channels are made the same by an additional step of rearranging the order of sequence of the samples of selected sample pairs in one channel.

6. Method as defined in claim 5, in which the selected sample pairs which are rearranged in said additional step are composed of a sample of said luminance signal and a sample of one component of the chrominance signal which is always the same component for the pairs of samples which are rearranged.

* * * * *